United States Patent [19]

Eickmann

[11] 4,009,849
[45] Mar. 1, 1977

[54] FLUID-STREAM DRIVEN AIRCRAFT

[76] Inventor: Karl Eickmann, 2420 Isshiki, Hayama Machi, Kanagawa, Japan

[22] Filed: July 10, 1974

[21] Appl. No.: 487,272

Related U.S. Application Data

[63] Continuation-in-part of Ser. No. 104,676, March 8, 1971, Pat. No. 3,823,898.

[52] U.S. Cl. .......................................... 244/53 R
[51] Int. Cl.² ........................................ B64D 31/00
[58] Field of Search ........... 244/12 R, 17.11, 17.21, 244/17.23, 53 R, 55, 60, 65, 73 R, 62, 63

[56] References Cited

UNITED STATES PATENTS

| | | | |
|---|---|---|---|
| 1,827,438 | 10/1931 | Rauch | 244/53 R |
| 1,939,156 | 12/1933 | Wright | 244/53 R |
| 2,212,490 | 8/1940 | Adler | 244/53 R |
| 2,349,286 | 5/1944 | Kreitner et al. | 244/65 |
| 2,454,138 | 11/1948 | Delzer | 244/60 |
| 2,514,822 | 7/1950 | Wolfe | 244/17.23 |
| 2,804,016 | 8/1957 | Moore | 60/486 |

FOREIGN PATENTS OR APPLICATIONS

| | | | |
|---|---|---|---|
| 58,961 | 5/1913 | Austria | 244/17.11 |
| 1,148,657 | 12/1957 | France | 244/17.21 |

*Primary Examiner*—Trygve M. Blix
*Assistant Examiner*—Galen L. Barefoot

[57] ABSTRACT

An aircraft body has a pair of hydraulic fluid operated motors mounted on it, a pair of stream-creating devices driven by the motors and symmetrically arranged on opposite sides of the axis of symmetry of the body. One or more hydraulic fluid-flow producing devices has at least a pair of separate fluid-handling chambers each connected to one of a pair of separate outlets, and including arrangements for fluid-tight separation of the chambers and outlets, so that fluid from each chamber passes through only one of the outlets. A pair of displacement units is associated with the fluid-handling chambers, respectively, and an equally acting actuator arrangement cooperates equally with both of the two displacement units for maintaining equal movements of the two displacement units so that fluid flows in the outlets at proportionate and equal flow rates. A pair of delivery passages connects each of the outlets with a different one of the motors, respectively.

1 Claim, 5 Drawing Figures

FLUID-STREAM DRIVEN AIRCRAFT

CROSS REFERENCE TO RELATED APPLICATION

This is a continuation-in-part of my copending application entitled "A Hydraulically Controlled Fluid-stream Driven Aircraft," filed on Mar. 8, 1971 and copending under Ser. No. 104,676, now U.S. Pat. No. 3,823,898.

BACKGROUND OF THE INVENTION

The present invention relates generally to an aircraft, and in particular to a fluid-stream driven aircraft.

In my aforementioned copending application, I have disclosed a fluid-stream driven aircraft having a plurality of fluid-driven propellers located at opposite sides of an axis of substantial symmetry of the aircraft body.

I have found, however, that still further improvements over the invention disclosed in the copending application are desirable, in order to improve the safety and performance of the aircraft still more.

SUMMARY OF THE INVENTION

Accordingly, it is an object of the present invention to provide such further improvements.

Moreover particularly, it is an object of the present invention to provide a fluid-stream driven aircraft which incorporates such improvements.

In keeping with these objects, and with others which will become apparent hereafter, one feature of the invention resides, in a fluid-stream driven aircraft, in a combination which comprises a body having an axis of substantial symmetry, at least one pair of hydraulic-fluid operated motors on the body, and a pair of stream-creating means driven by the motors, respectively, and arranged symmetrically on opposite sides of the axis. At least one hydraulic fluid-flow producing means is provided, having at least a pair of separate fluid-handling chambers each connected to one of a pair of separate outlets, and including means for fluid-tight separation of the chambers and outlets so that fluid from each chamber passes through only one of these outlets. A pair of displacement means is associated with the fluid-handling chambers, respectively. Equally acting actuator means cooperates equally with both of the two displacement means for maintaining equal movements of the two displacement means so that fluid flows in the outlets at proportionate and equal flow rates. A pair of delivery passage means connects each of the outlets with a different one of the motors, respectively, so that the stream-creating means on opposite sides of the axis of symmetry are driven at equal velocities for producing equal thrusts on both sides of the axis to stabilize the movement and attitude on the aircraft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
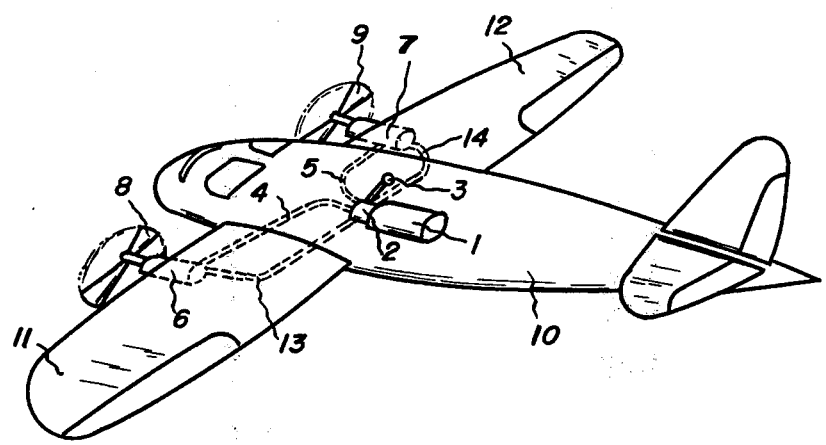
FIG. 1 is a somewhat simplified perspective view illustrating an aircraft provided with one embodiment of the invention.

Referring firstly to FIG. 1, it will be seen that the FIGURE illustrates an embodiment of a hydraulically controlled fluid-stream driven aircraft which is inexpensive to manufacture, handles well and easily and is very safe in operation. The aircraft has a body 10 provided with a pair of wings 11 and 12. A fluid-flow producing means is mounted on the body 10 and includes a power plant or prime mover 1, and a multiple-flow variable pump 2 of one of the types which will be described with reference to FIGS. 3–5. The rotor of the pump 2 is driven by the prime mover 1, and produces at least two separate flows or streams of hydraulic fluid. Adjusting means 3 is provided which adjusts the fluid flows in the different streams in a sense reducing or increasing the flow, but assuring that in any case the two flows are equal to one another at all times. The flows of fluid may be varied simultaneously between a zero flow rate and the maximum flow rate. Reference numerals 4 and 5 identify fluid passages which extend from the pump 2 to respective positive-displacement fluid motors 6 and 7, which drive propellers 8 and 9, respectively. The spent fluid returns from the motors 6 and 7 via respective return conduits 13 and 14 to the pump 2.

Figure 3:
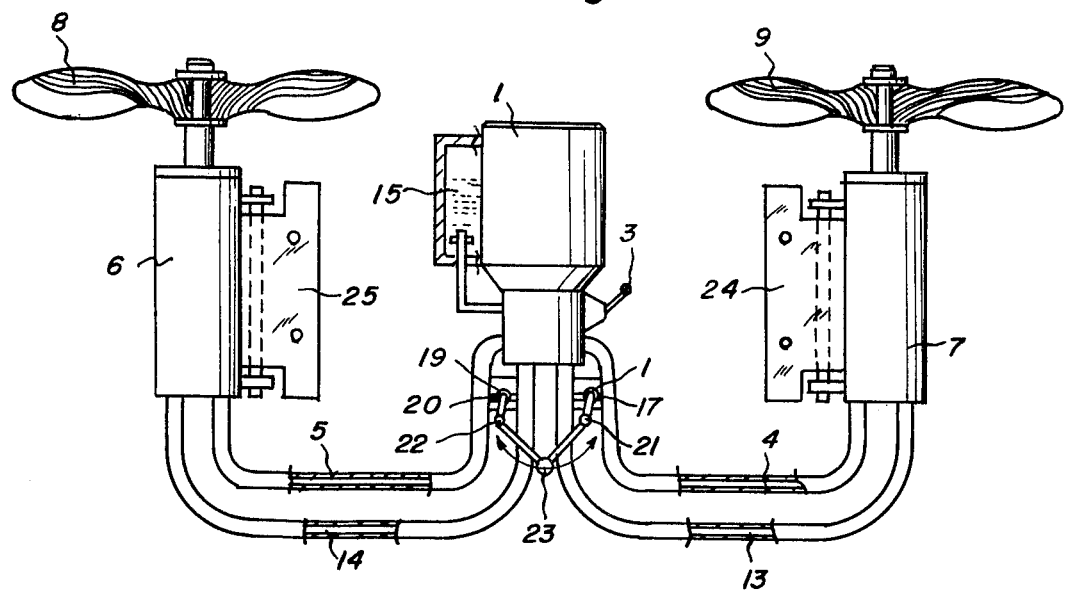
FIG. 3 is a partly sectioned view illustrating a hydrostatic power supply according to the present invention.

A hydrostatic power supply unit which can be used with advantage in the embodiment of FIG. 1, and which has in fact been diagrammatically illustrated therein, is shown in more detail in FIG. 3. It should be noted that this power unit is of a type which can be separately transported and secured to any desired craft, such as the aircraft in FIG. 1.

Like reference numerals in FIG. 3 identify the same components as in FIG. 1. Reference numeral 15 identifies a reservoir for fluid, from which the fluid flow producing means 1 receives the fluid via two lines 16 (only one shown). The fluid flow actuator means 3 acts equally in order to control the displacement volume of the displacement chambers in the fluid-flow producing means 1 (which may be of the type disclosed in FIG. 5) proportionately to each other if they change their volume. The means 3, therefore, assures that at all times at least a plurality of flows, such as a pair of flows, of equal flow rate or of proportional rate of flow travels from the fluid-flow producing means 1 separately into the fluid lines 4 and 5, to assure the proportionality of angular velocity of the propellers 8 and 9 at all times. By-pass lines 17, 18, 19, 20 may be provided between the outgoing fluid lines 4 and 5 and the respective return fluid lines 13 and 14, to enable the flow of a small fraction of fluid which flows through the delivery fluid lines 4 and 5, back into the return fluid lines 13 and 14. The bypasses may be operated separately from each other, or they may be operated in combination by an operating means 23 connected to the valves 21, 22 of the bypasses. By using the combined operating means 23, which again is to act equally and cooperate with both of the sets of in- and outgoing fluid lines, it is possible with a single operating control to change the rotary velocity of the propellers 8 and 9 relative to each other, and thus by using only a single handle to change the thrust of the fluid streams produced by the propellers 8 and 9 in any desired way.

Figure 2:
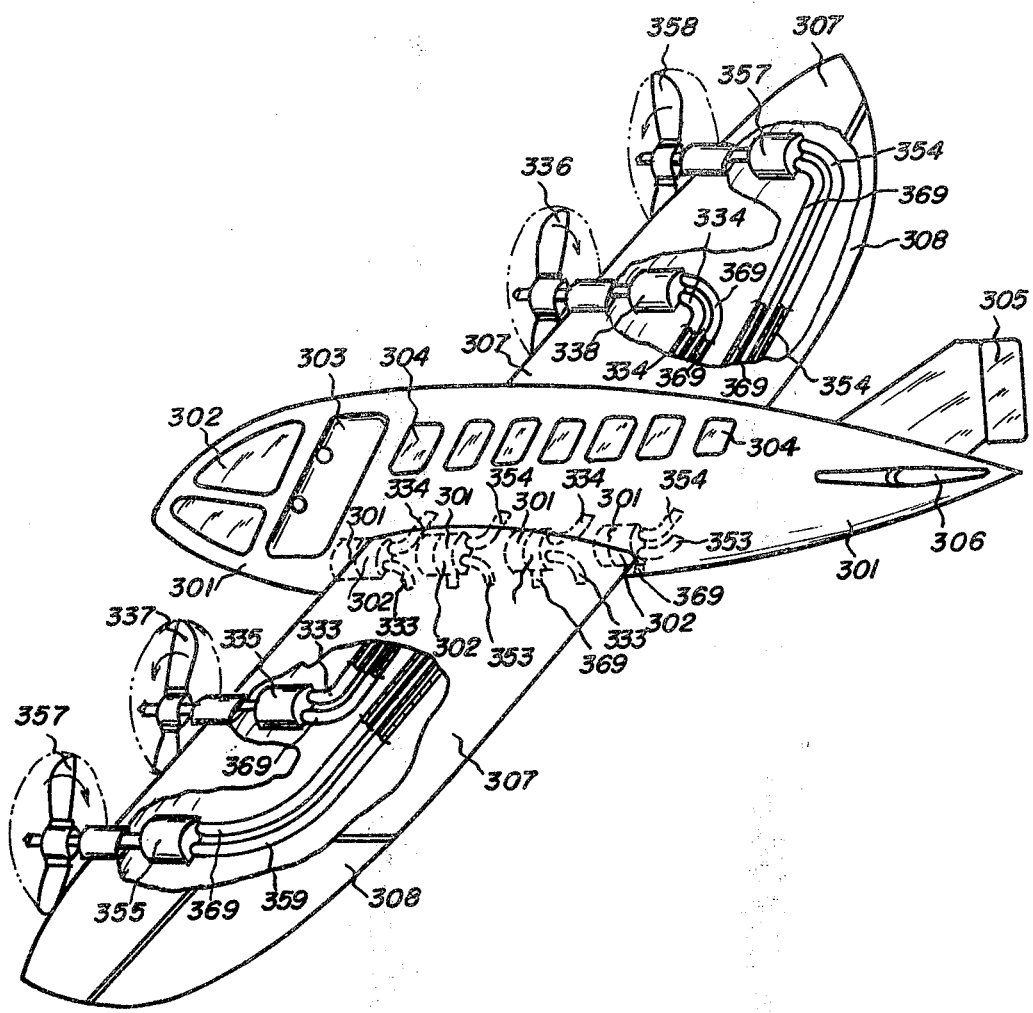
FIG. 2 is a view analogous to FIG. 1, partly broken away, but illustrating an aircraft incorporating a different embodiment of the invention.

FIG. 2 illustrates by way of example a further aircraft somewhat analogous to that of FIG. 1, but provided with a plurality of pairs of propellers, namely four propellers 336, 337, 357 and 358. Thus, for example, one set of propellers 336, 337 may be of the fixed type which cannot have the pitch of its blades changed, whereas the propellers 357 and 358 may be of the adjustable type where the pitch of the blades can be changed.

Since in FIG. 2 there are several pairs of propellers provided, the embodiment of FIG. 2 must also have several separated fluid streams of equal rate of flow. The fluid flow 333 drives the fluid motor 335 and returns via a return line 369. Fluid flow 334 drives fluid motor 338. Fluid flow 354 drives fluid motor 356. All of the fluid flows return through their respective return lines 369 directly or indirectly to the fluid flow producing means. All of the flows 333 and 334 are of equal or proportionate rate of flow. The other pair of fluid flows 353 and 354 is also separated from each other and they are also of proportionate rate of flow. A plurality of fluid-flow producing means 302 is provided, which may be driven by a plurality of power plants 301.

The relatively compact size of the fluid motors makes it possible to locate them in small spaces in the wings 307. The construction makes it possible to have the propellers 337, 336, 357, 358 rotate in opposite directions, because it is simple to reverse the direction of rotation of the fluid motor. Thus, propellers 337 and 338 may, for instance, revolve in mutually opposite directions.

The aircraft has a freight or passenger cabin 304, and an entrance 303 into the same. Cabin 302 may be provided as a pilot cabin. It should be noted that it is possible and in fact preferred to have the heavier components of the drive, such as the power plants and fluid-flow producing means, located at the bottom of the body 301 of the aircraft. Equally acting actuator means cooperates equally with all fluid-flow producing means, or rather with the displacement means in the fluid-handling chambers thereof, and this has the advantage that by means of a single control the rate of flow of fluid of all of the fluid streams can be controlled, and thereby the angular velocities of all of the propellers. Reference numerals 305 and 306 identify control rudders, and the flaps on the rings 307 are identified with reference numeral 308. Details of the construction and operation of FIGS. 1, 2, 3 and 4 are already to be found in the aforementioned copending application, the disclosure of which is incorporated herein by reference.

Figure 4:
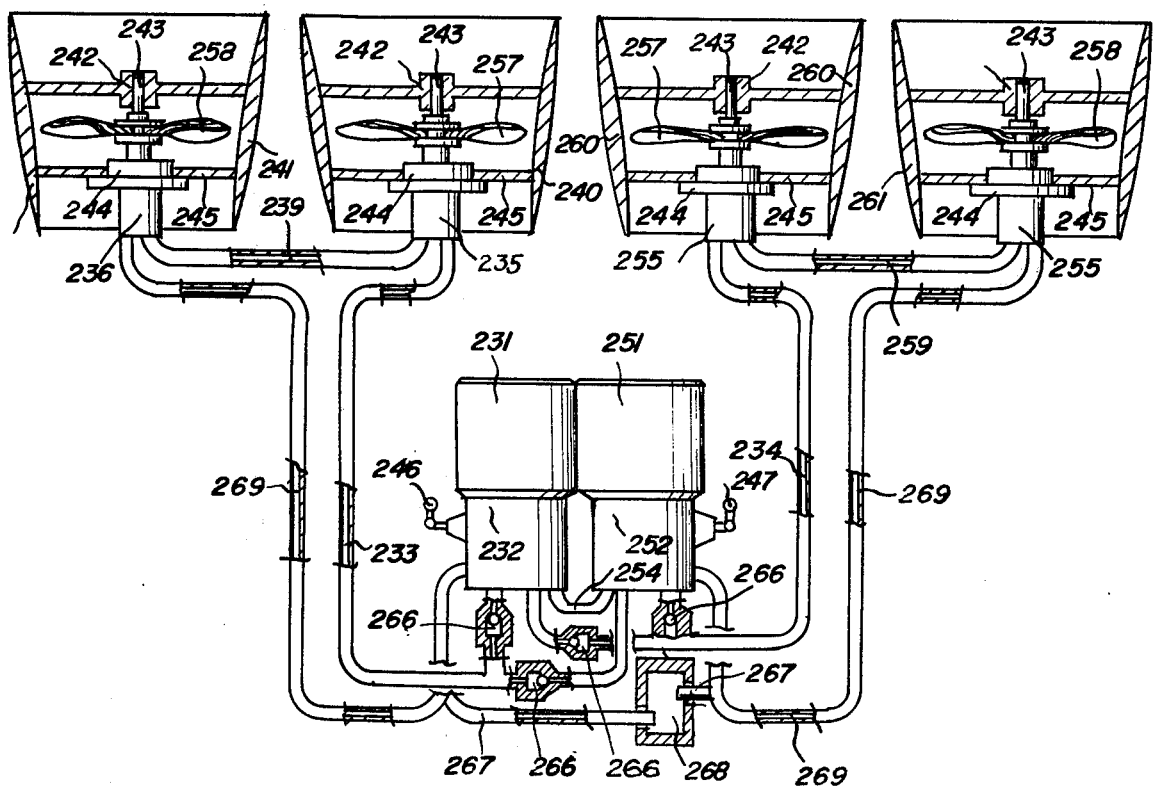
FIG. 4 is a view analogous to FIG. 3, but illustrating a further embodiment of the power supply.

FIG. 4 shows another embodiment of a hydrostatic power supply unit, which can also be either mounted on an aircraft or separately transported for later fixing to it. This FIGURE demonstrates several possibilities. A delivery fluid line 233 transfers a flow of fluid into a positive displacement fluid motor 235, and the return flow from the motor is through a medial passage 239 into a downstream fluid motor 239 from where the return fluid stream flows through a return fluid line 269 directly or indirectly back to a respective fluid flow producing means or a tank accommodating fluid. A second fluid stream passes through a delivery fluid line 234 into a positive displacement fluid motor 255 and from there via a fluid line 259 into a fluid motor 256, to return from the same through a return fluid line 269 directly or indirectly to a fluid-flow producing means or to a tank or reservoir therefor. This assures that two flows of fluid, which are separated from each other and which flow each through a different fluid line 233, 234, operate jointly four fluid motors, in that each fluid flow drives two of the fluid motors. This makes it possible to use only two flows of fluid to create four streams of fluid of proportionate rate of flow. For this purpose the rotary components of the respective fluid motors are connected to the propellers 237, 238, 257 and 258.

This embodiment might be used in the aircraft of FIG. 2 in lieu of the one that has been shown therein.

Since the fluid-flow producing means according to the invention necessarily provide a proportionality of the flow rate in separated flows of fluid, it is assured that a proportionality of rotary velocity of the fluid motors is obtained, and therefore also of the propellers 237, 238, 257 and 258. Thus, the reaction forces and thrusts of the fluid streams are maintained proportionate under all operational conditions.

It is further advantageous if the propellers are accommodated in ducts, as shown, because the thrust of the propellers can thereby be considerably increased. Fluid motor 235 is mounted on flange means 244 and a fastening means 245 of a duct 240. The shaft of the fluid motor 235 and thereby of the propeller 237 can be mounted in bearing means 234 of the fastening means 242. The fluid motor 236 is similarly mounted by flange means 244 and fastening means 245 in the duct 241, and the shaft of the fluid motor 236 may be mounted in bearing means 243 secured to fastening means 242. Fluid motor 255 may be mounted by flange means 244 on fastening means 245 of the duct 260, and its shaft may be mounted in bearing means 243 of fastening means 242. Fluid motor 256, finally, may be mounted by flange means or fastening means 245 of the duct 261 and its shaft may be mounted in bearing means 243 of fastening means 242. In addition to serving to direct the fluid streams which result from rotation of the propellers 237, 238, 257 and 258, the ducts have the further advantage of surrounding the propellers and thus serving as a safety aid against accidents.

In FIG. 4, a plurality of fluid-flow producing means 232 and 252 are provided and actuated by power plants 231 and 251, respectively. They are connected with one another in that they may have a common return or interconnecting return fluid line 264. They may also have delivery fluid lines which transfer fluid out of a tank 268 into the respective fluid flow producing means 232 and 252, and the latter each produces at least a pair of separated fluid streams of proportionate rate of flow. One fluid stream moves out of the fluid-flow producing means 232 through a check valve 266 into the fluid line 233, and another fluid stream of proportionate rate of flow travels separately from the fluid-flow producing means 252 through check valve 266 which is associated with the latter, into the common fluid line 233.

Another flow of fluid flows from the fluid-flow producing means 233 at proportionate rate of flow through another check valve 266 into the fluid line 234, and still another flow of fluid which is also separated and of proportionate rate of flow, flows from the fluid-flow producing means 252 through an additional check valve 266 into the fluid line 234. In the event that during the operation one of the power plants 231 or 251 should fail, or if one of the fluid-flow producing means 232 or 252 should fail, then the other fluid-flow producing means would still continue to deliver at least one flow of fluid into each of the common fluid lines 233 and 234, respectively. The respective check valves 266 would prevent a return flow of fluid from the common fluid lines 233 and 234 back into the fluid-flow producing means which is not operating, so that a safe operation of the system would still be assured as long as only one of the fluid-flow producing means or power plants continues to operate.

The return fluid lines 269 may return the return flow of fluids directly or indirectly into the tank 268, or via cooling means into the tank 268, or else directly into the respective fluid-flow producing means 232 or 252, or into the passage 264. The passge 264, incidentally, may be a drain line if desired. The fluid lines 267 may be suction fluid lines, or fluid lines which deliver fluid into the fluid-flow producing means 232 or 252. It is apparent that instead of providing only two fluid-flow producing means 232 and 252, it would be possible to utilize more of them, and if necessary to utilize also more of the power plants 231 and 251, in which case the system illustrated in FIG. 2 could be obtained.

The fluid-flow producing means 232 and 252 are advantageously provided with fluid-flow adjusting means 246 and 247, so that the displacement volumes of the positive displacement chambers in the fluid-flow producing means, which change from minimum to maximum and vice versa during the operation of the fluid-flow producing means, will be proportionately adjusted so that the subtraction of the minimum volume from the maximum volume of the respective positive displacement chamber remains at all times proportionate to the respective volumes of others of the positive displacement chambers. The adjusting means 246 or 247 could be operated separately or in combination.

Figure 5:
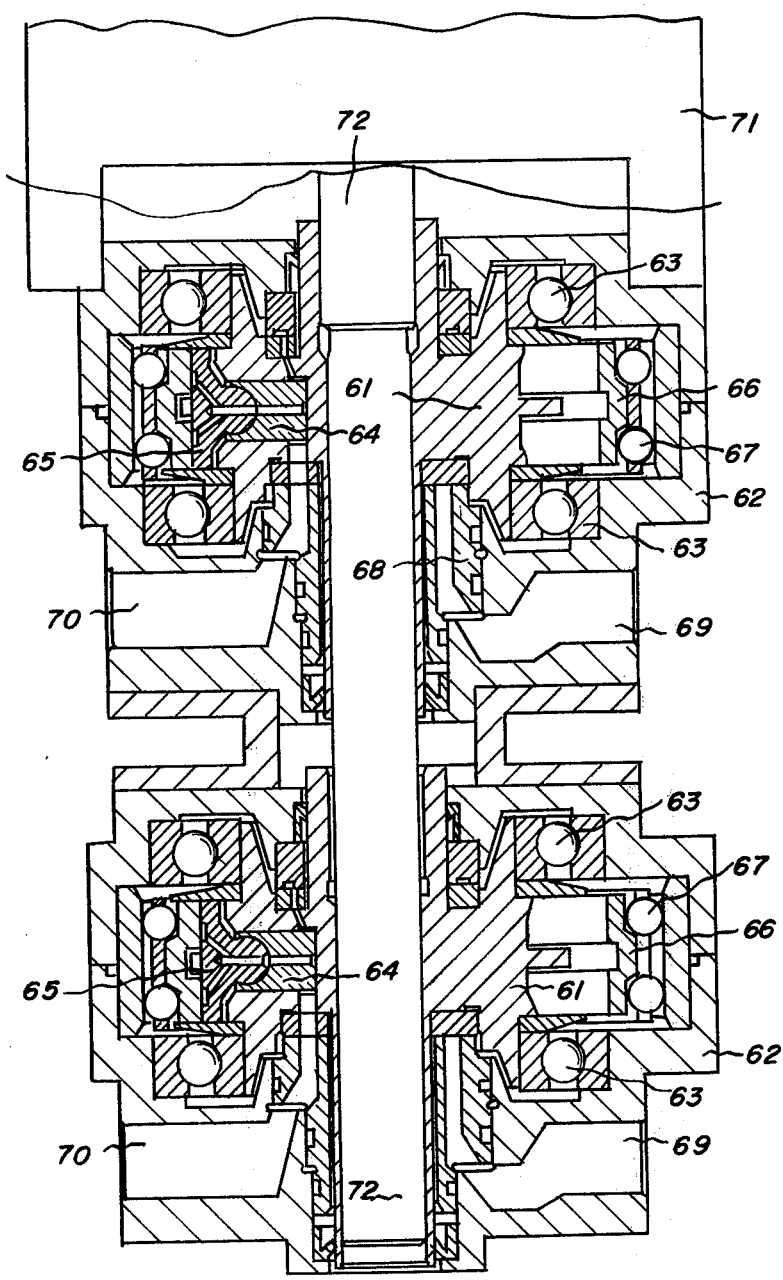
FIG. 5 is a fragmentary sectional illustration showing another embodiment of the invention.

FIG. 5 illustrates in detail how in any of the preceding embodiments equally acting actuator means may cooperate equally with the displacement means of the fluid-handling chambers of the respective fluid-flow producing means. In this Figure, reference numeral 71 identifies a power plant which drives a shaft 72 that extends through two coaxial pumps. In the pumps the rotors 61 are rotatably mounted in housings 62. Displacement means 64 serve to draw in and expel fluid with respect to the cylinders in the rotors 61. Piston shoes 65 may be associated with the displacement means 64 which are pistons, between the latter and the actuator means 66, which enforce a definite displacement or stroke of the displacement means 64 in order to actuate each fluid flow at a definite rate of flow. Antifriction bearing 63 may be provided between the rotors 61 and the housings 62, and additional antifriction bearing 67 may be provided between the actuator means 66 and the housings 62. A control member 68 may be provided to establish a fluid-tight seal between the respective rotor 61 and housing 62, and a pair of ports of which one serves for entry of fluid and one for exit of fluid is provided in each pump and communicates with the respective cylinders through passage means located in the housing and rotor and the control body if the latter is present.

The shaft 72 drives both pumps with equal rotary velocity and may extend through both pumps, but is associated with the engine or power plant and with both of the pumps together.

The two actuator means 66 are so assembled that they act equally, that is they cooperate equally with both pumps to assure that the rate of fluid flowing out of each pump is equal to the rate of fluid flowing out of the other pump. In the illustrated embodiment, the pumps are radial piston pumps, and the pistons 65 and piston shoes which cooperate with the respective actuator means 66 are so controlled by the latter that equal flow rates are assured, since in each pump the central axis of the actuator means 66 is equally spaced from the rotor axis.

Of course, various modifications would be possible. Thus, instead of providing the two pumps in a coaxial arrangement, a plurality of pumps could be driven by a multiple gear.

It will be understood that each of the elements described above, or two or more together, may also find a useful application in other types of constructions differing from the type described above.

While the invention has been illustrated and described as embodied in a fluid-stream driven aircraft, it is not intended to be limited to the details shown since various modifications and structural changes may be made without departing in any way from the spirit of the present invention.

Without further analysis, the foregoing will so fully reveal the gist of the present invention that others can be applying current knowledge readily adapt it for various applications without omitting features that from the standpoint of prior art fairly constitute essential characteristics of the generic or specific aspects of this invention.

What is claimed as new and desired to be protected by Letters Patent is set forth in the appended claims:

1. A fluid-stream driven aircraft, comprising, in combination, a body having an axis of substantial symmetry; pairs of hydraulic fluid-operated motors on said body; pairs of stream-creating means driven by said motors, respectively, and arranged symmetrically on opposite sides of said axis; a plurality of hydraulic fluid-flow producing means each having at least a pair of separate fluid-handling chambers each connected to one of a pair of separate outlets, and including means for fluid-tight separation of the chambers and outlets so that fluid from each chamber passes through one of said outlets only; a pair of displacement means associated with said fluid-handling chambers, respectively; equally acting actuator means cooperating equally with said displacement means for maintaining equal movements of said displacement means so that fluid flows in said outlets at proportionate and equal flow rates; pairs of delivery passage means connecting each of said outlets with a different one of said motors, respectively, whereby said stream-creating means on opposite sides of said axis are driven at equal velocities for producing equal thrusts on both sides of said axis to stabilize the movement and attitude of said aircraft, each of said fluid-flow producing means supplying a plurality of separated flows of fluid of proportionate rate of flow into a plurality of separated fluid lines; some of said plurality of fluid-flow producing means being communicated together to form a combined multiflow circuit system of a plurality of separated flows of fluid of proportionate rate of flow, and others of said plurality of fluid-flow producing means also being communicated together to form another combined multiflow circuit system of a plurality of separated flows of fluid of equal rate of flow, so that said combined multiflow circuit systems may either be combined or independently operated and controlled; at least a pair of separated fluid lines of at least two of a plurality of fluid-flow producing means in each of said combined multiflow circuit systems being combined together to form respective pairs of separated common fluid lines; pairs of separated positive displacement fluid motors communicated to respective pairs of said separated common fluid lines, at least one fluid motor of each of said pairs of separated positive displacement fluid motors communicating with one of the fluid lines of the pairs of fluid lines; said combined multiflow circuit systems by connection of rotor members to the said fluid motors actuating at least two pairs of jointly or independently operable and controllable streams of fluid, wherein the streams of each pair of streams of fluid are of proportionate rate of flow; and means for preventing return flow from said separated common fluid lines to and through one or more of said fluid-flow producing means.

* * * * *